May 1, 1962
H. PAPST
3,032,666
WINDING MOTOR
Filed Sept. 18, 1956
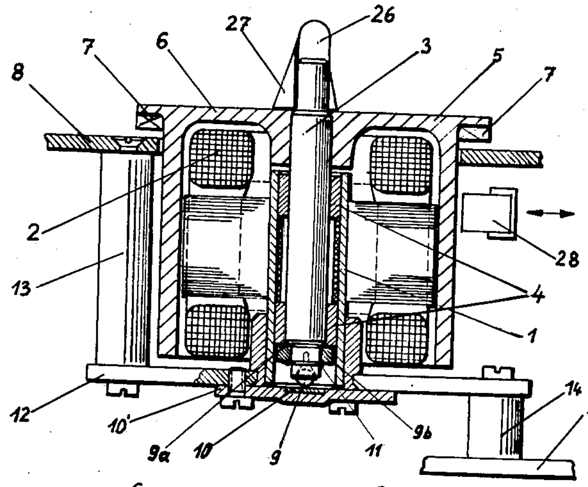
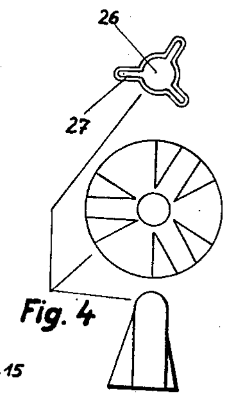
Fig. 4
Fig. 1
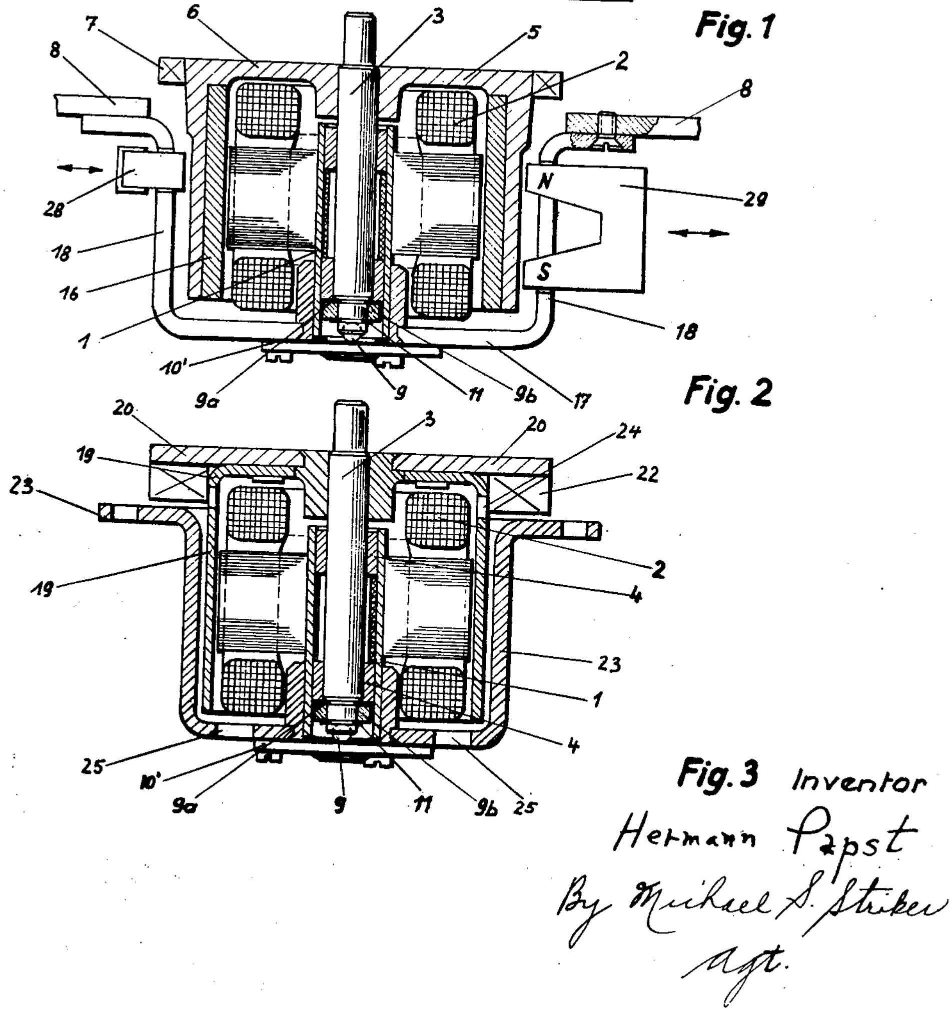
Fig. 2 Fig. 3
Inventor
Hermann Papst
By Michael S. Striker
Agt.

United States Patent Office 3,032,666

Patented May 1, 1962

3,032,666

WINDING MOTOR

Hermann Papst, Karl Maierstr. 1, St. Georgen, Black Forest, Germany

Filed Sept. 18, 1956, Ser. No. 610,511
Claims priority, application Germany Oct. 24, 1955
10 Claims. (Cl. 310—67)

The present invention relates to winding motors adapted to be used, for example, for winding a flexible element onto a spool. Such motors are used, for example, in sound recording and reproducing devices where a magnetic tape or wire is wound on to one spool while being unwound from another spool during the recording of sound on the wire or tape or during the reproduction of sound already recorded on a wire or tape.

At the present time sound recorders and reproducers of the highest quality, the so-called high fidelity sound recorders and reproducers, include a plurality of motors, and because of the high cost of these motors the cost of the high fidelity equipment is relatively high. Less expensive sound recorders and reproducers are available, but the less expensive equipment invariably includes but a single motor and from this single motor the motion is transmitted to the various parts through gears or the like and the different directions of rotation of the reels or spools is obtained by gear changing mechanisms. Because the motion is derived in the less expensive equipment from a single motor the less expensive equipment does not give the fine performance of the more expensive equipment which includes a plurality of motors. The less expensive equipment operates in a jerky rather than smooth manner and it does not infrequently happen that oil has access to friction clutches of such equipment so that these friction clutches do not operate reliably.

It is an object of the present invention to produce a motor suitable for winding an elongated flexible element onto a spool and being of such a simple construction and such a low cost that it is possible, for example, to use a plurality of such motors in a sound recording and reproducing apparatus and still enable such an apparatus to compete favorably with the less expensive equipment referred to above.

Another object of the present invention is to provide smoothly operating motors capable of being used in sound recording and reproducing devices of the highest quality while at the same time being far less expensive than the motors which are used at the present time in such devices.

A further object of the present invention is to provide a motor of the above type which is automatically cooled to an extent sufficient to prevent any undesirable overheating of the motor.

An additional object of the present invention is to provide suitable structures for braking the rotation of the rotor of a motor of the above type.

Still another object of the present invention is to provide a motor of the above type which is capable of being conveniently mounted in a sound reproducing and recording apparatus, for example, in a manner which prevents dirt or other foreign matter from getting into the apparatus and in a manner which reliably maintains the motor in the desired position and which enables the apparatus to be operated conveniently.

Still another object of the present invention is to provide a motion transmitting member for use with a motor of the above type capable of transmitting the rotation of the rotor of the motor to a spool or the like and at the same time guaranteeing that the spool will not be turned when the torque of the motor is so great that it would break a sound recording tape, for example.

It is also an object of the present invention to provide structure capable of accomplishing all of the above objects and at the same time composed of simple and ruggedly constructed elements which are very reliable in operation.

With the above objects in view the present invention mainly consists of a winding motor which includes an inner stator and an outer rotor surrounding the stator and having an end wall adapted to receive a spool on which an elongated flexible element is adapted to be wound. This end wall has an outwardly extending annular flange to which projections are fixed for moving air to cool the motor.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a sectional elevational view of one embodiment of a motor according to the present invention, this motor being shown together with a fragmentarily illustrated support structure of a sound recording and reproducing apparatus, for example, and the section of FIG. 1 being taken in a plane passing centrally through the motor;

FIG. 2 is a fragmentary sectional elevational view of another embodiment of a motor according to the present invention, FIG. 2 also showing a different arrangement for mounting the motor in a sound recording and reproducing apparatus, for example, and both FIGS. 1 and 2 showing devices for braking the rotation of the rotor;

FIG. 3 is a sectional elevational view of a third embodiment of a motor according to the present invention; and FIG. 4 shows a motion transmitting member according to the present invention in a front elevational and bottom plan view as well as the blank from which the motion transmitting member is formed.

Referring now to the drawings and to FIG. 1 in particular, it will be seen that a bridge member 12 forms a direct support for the motor and forms part of a framework which carries the motor. The bridge member 12 is formed with an aperture and has fixed to itself an upwardly extending tubular member having a bottom end located in this aperture, as is apparent from FIG. 1. This upwardly extending tubular member receives the bottom end of an elongated sleeve 1 which is fixed to the upwardly extending tubular member so that the elongated sleeve 1 remains stationary with the bridge member 12. The sleeve 1 carries the stator 2, and this stator 2 is a conventional stator which may be made of laminated pole pieces and windings.

A pair of bearing rings 4 made of sintered metal, for example, are located within and fixed to the sleeve 1, and a shaft 3 is supported for rotation about its axis by the bearing rings 4 through which the shaft 3 passes, this shaft 3 slidably engaging the bearing rings 4. The motor of the invention includes a rotor 5 made of any suitable ferrous material, for example, and fixed in the manner shown in FIG. 1 as by a press fit, for example, to a part of the shaft 3 which extends upwardly beyond the sleeve 1, this shaft 3 extending through and beyond the upper end wall 6 of the rotor 5. It will be noted that the rotor 5 includes a cylindrical wall surrounding the stator and having a bottom open end, as viewed in FIG. 1, while the upper end of the cylindrical wall is closed by the end wall 6 of the rotor 5.

The opening in the bridge member 12 is closed by a cap member 10' which is fixed by suitable screws or the like to the bridge member 12 at its bottom face, as viewed in FIG. 1, and the cap member 10′ carries in its interior a plate 10 of relatively hard metal against which a steel ball member 9 or the like bears. This ball member 9 is located in a suitable socket formed in the bottom end of the shaft 3, so that elements 9 and 10 perform the function of a thrust bearing and support the shaft 3 for rotation about its axis together with the rotor 5. A bearing ring 9*a* bears against the bottom end face of the bottom bearing ring 4, and this bearing ring 9*a* engages with its bottom face a ring 9*b* made of a suitable plastic and surrounding the shaft 3. The shaft 3 is formed at the lower face of the ring 9*b* with an annular groove which receives a snap ring 11 which engages the ring 9*b*, so that with this structure axial play of the shaft 3 is eliminated and even if the structure is not in the position of FIG. 1 the rotor will not fall from the rest of the structure.

The bridge member 12 is fixed at its left end, as viewed in FIG. 1, to the bottom end of an elongated rigid spacer member 13 which is fixed at its top end to an upper plate 8 of the device, this plate 8 being stationary and fixed to the supporting framework of the device so that the plate 8 forms a support plate for supporting the motor structure through the spacer 13 and the bridge member 12. At its right end, as viewed in FIG. 1, the bridge member 12 rests on a tubular member 14 through which a screw extends into threaded engagement with a stationary support plate 15, the head of this screw engaging the upper face of the bridge member 12, as shown in FIG. 1, so that in this way the right end of the bridge member 12 is fixed to the support plate 15. Of course, the left end of the bridge member 12 could also be fixed to the plate 15, if desired, and the right end of the bridge member 12 could be fixed to another spacer member 13 which is in turn fixed to the support plate 8, if desired.

It will be noted from FIG. 1 that the cylindrical wall of the rotor 5 extends with relatively small clearance through an opening formed in the support plate 8. The end wall 6 of the rotor 5 has an outwardly extending annular flange which covers the gap between the rotor and the support plate 8, so that in this way dirt or other foreign matter cannot enter into the interior of the device.

Furthermore, projections 7 in the form of radially extending fins or the like are affixed to the underside of the outwardly extending annular flange of the end wall 6, and these projections 7 act as air moving blades which during rotation of the rotor 5 cause air to move past the motor in order to cool the same. The rotor 5 itself is made of a material having a high coefficient of thermal conductivity and serves to carry away heat from the motor.

The upper surface of the end wall 6 of the rotor 5, as viewed in FIG. 1, receives the spool which is to be wound and acts directly as a support for the spool, so that special elements for this purpose are not required.

With the embodiment of FIG. 1 the ferromagnetic rotor 5 is fairly heavy, and in order to reduce the weight of the rotating mass, the embodiment of FIG. 2 may be used. As is apparent from FIG. 2, the rotor 5 has a larger diameter than the rotor 5 of FIG. 1, and a ferromagnetic insert 16 of cylindrical shape is located within and fixed to the rotor 5 and has an inner face directed toward the stator 2 so as to cooperate therewith. The rotor 5 of FIG. 2, with the exception of the insert 16, is made of a light metal such as aluminum, for example.

Furthermore, with the embodiment of FIG. 2 a substantially U-shaped strap 18 serves to support the motor, this strap 18 having a lower part 17 formed with an opening identical with the opening in the bridge member 12 and supporting the motor in the same way. The upper ends of the legs of the U-shaped strap 18 are curved outwardly in a substantially horizontal direction and are fixed directly to the support plate 8, as shown in FIG. 2. The end wall 6 of the rotor 5 of FIG. 2 may include an outwardly extending flange and fins 7 as shown in FIG. 1, or, as is shown in FIG. 2, the fins 7 may extend directly from the upper outer surface portion of the rotor, in order to act as fan blades for moving air past the motor in order to cool the same.

Except for the above noted differences, the structure of FIG. 2 is identical with that of FIG. 1.

In order to quickly stop the rotation of the rotor, a mechanical brake 28 may be used as shown in FIGS. 1 and 2. This brake member 28 may be made of felt or cork, for example, and is horizontally shiftable in both directions, as viewed in FIGS. 1 and 2, through any suitable manually actuated linkage, for example, so that when the brake member 28 is moved into engagement with the outer surface of the cylindrical part of the rotor 5 the rotation of the latter is quickly stopped. Inasmuch as the brake member 28 cooperates directly with the outer surface of the rotor 5, a separate brake shoe is not required.

Instead of a mechanical braking arrangement, the rotation of the rotor may be braked electrically. Thus, it is possible to generate in the supporting frame structure of the motor a direct current which produces eddy currents for braking the rotation of the rotor. Also, a permanent magnet such as the magnet 29 shown in FIG. 2 may be moved toward and away from the rotor, and as the permanent magnet approaches the rotor this magnet also causes eddy currents to be produced for braking the rotation of the rotor. Instead of a permanent magnet, it is also possible to use an electromagnet. Any suitable manually actuated linkage may be employed for shifting the magnet 29.

In order to reduce the weight of the rotating mass to an even greater extent, the embodiment of FIG. 3 may be used. With this embodiment of the invention the rotor is in the form of a hollow member 19 which is extremely thin and which may be made of a ferromagnetic material or of aluminum, for example. An end wall 20 is joined to the hollow rotor member 19 for rotation therewith and in good heat conducting relation therewith. The rotor 19 extends into a stationary hollow housing member 23 which has a bottom wall serving to support the motor in the same way as the bridge member 12 or the strap 18, and the upper part of the stationary housing member 23 has an outwardly extending flange which is formed with openings to receive screws for fixing this flange to the support plate 8, so that in this way the motor of FIG. 3 is supported in the machine. The stationary housing member 23 is made of a ferromagnetic material and serves to provide a return flow path for the flux.

The rotor 19 is formed adjacent its top end with openings 24, and the bottom wall of the housing member 23 is formed with openings 25. The element 20 extends outwardly beyond the rotor 19 and has fixed to its underside a plurality of blades 22 which act as fan blades and serve to move air through the openings 24 and 25 for cooling the motor.

In accordance with the present invention the upper free end of the shaft 3 cooperates with a motion transmitting member for transmitting motion to the spool or reel which rests on the upper wall of the rotor. The details of this motion transmitting member are illustrated in FIG. 4, and the motion transmitting member is shown in its operative position in FIG. 1. As is shown at the central portion of FIG. 4, the motion transmitting member is formed from a circular piece of sheet metal which has high springy characteristics, and this circular blank is stamped so as to be folded along the lines indicated in the central portion of FIG. 4. This produces the motion transmitting member 26 which is in the form of a hollow cap of substantially cylindrical configuration having three fin-like projections 27 extending outwardly therefrom in radial directions, respectively, and being angularly spaced from each other by 120°, these projections 27 being adapted to fit into slots of the spool for transmitting rotation thereto. The inner diameter of the cap 26, when the latter is unstressed, is slightly smaller than the outer diameter of the upper free end portion of the shaft 3, so that when the cap 26 is placed on the upper free end portion of the shaft 3 the cap 26 resiliently grips the upper end portion of the shaft 3 to be frictionally connected thereto. The frictional force with which the cap 26 grips the upper end portion of the shaft 3 is great enough to reliably transmit rotation to the spool during normal operation. However, if for any reason the torque supplied by the motor is so great as to cause a recording tape or the like to break, for example, then the shaft 3 is capable of slipping with respect to the cap 26, so that this cap 26 serves the additional function of a friction clutch, and prevents breaking of the tape.

The rotors of the invention may be made in any suitable way as by die casting, for example.

Wtih the embodiment of FIG. 3, the outer stationary housing 23 serves to form a return flow path for the flux, and in this case the thin-walled rotor receives only those currents which are present, for example, in the cage of a squirred cage motor; the main flow for the flux being provided by the outer stationary housing.

As is apparent from FIGS. 1–3, the sleeve 1 forms together with the bridge 12, the strap 18, or the housing 23 an enclosure which can receive a lubricant so that proper lubrication of the rotating shaft 3 is guaranteed. Furthermore, instead of providing a separate ball member 19, the bottom end of the shaft 3 may be of a spherical configuration.

In a sound recording and reproducing apparatus, a pair of motors as described above are respectively connected operatively to a pair of spools for winding the tape or wire off of one spool and onto the other spool, and then of course rewinding is necessary. The motors are connected so as to rotate in opposite directions. In order to provide a speedy rewinding, the current may be cut off from one of the motors, or this one motor may be provided with a relatively low voltage so that it maintains the tape or wire tensioned in this manner. The other motor has a sufficiently great voltage to overcome the one motor with the lower voltage and thus is capable of rewinding.

The above described motors provide rotating members which are free of rivets and which operate without any backlash. They are also capable of providing constant, uniformly rotating fields which provide an extremely uniform turning force. In this way the disadvantages resulting from loosening and tensioning of the recording tape or wire are avoided. The extremely uniform rotating field is obtained by the split phase winding of the stator. The rotating housing of the motor operates as a rivetless cage or secondary part of an induction motor. Where the rotors are made of light metal such as aluminum, as shown in FIGS. 2 and 3, the magnet such as the magnet 29 may be placed at such a distance from the rotor that it produces eddy currents which provide an extremely uniform electrical braking force which prevents almost entirely any disturbances in the tension of the band or wire and makes possible a "flutter" free sound reproduction.

As was mentioned above, with the embodiment of FIG. 3 the rotor 19 may be made of light metal such as aluminum, or it may also be made of iron. In this latter case the field of the stator is partly in the rotating rotor and partly in the stationary housing 23, while when the rotor is made of pure aluminum the return flow path for the flux is provided solely by the outer stationary housing 23. With this latter arrangement the weight of the rotating mass is reduced to a minimum but the consumption of electricity is greater. With the motors of the invention it is possible to provide in spite of their simple construction a high quality sound reproducing and recording arrangement. Inasmuch as the motors of the invention are suitable for single phase operation, they are capable of providing a very high torque when thye are started and therefore they are very suitable for winding motors. The watt consumption increases only to a small extent when the motor operates at a very slow speed until it stops, as a result of the skin effect in the relatively large rotor.

It will be understood that each of the elements described above, or two or more together, may also find a useful application in other types of motors differing from the types described above.

While the invention has been illustrated and described as embodied in induction motors suitable for winding purposes, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An electric motor arrangement for a magnetic sound recorder and the like, comprising, in combination, a support plate formed with an opening therethrough, said opening having an axis; a stator; fastener means fixedly securing said stator to said support plate in axial alignment with said opening, said stator extending transversely of said plate from one side of the latter; and a substantially cup-shaped rotor secured to said stator for rotation relative thereto about said axis, said rotor including a substantially cylindrical axial metal shell and a radial end wall, said shell extending through said opening and surrounding said stator in closely spaced relationship, said end wall radially extending from said axis on the other side of said plate and substantially covering said opening.

2. A motor arrangement as set forth in claim 1, said fastening means comprising: a hollow sleeve said stator being fixedly mounted on said sleeve, the arrangement further including a shaft rotatably mounted in said hollow sleeve, said shaft having an end extending through said opening beyond the stator, said end wall including a hub fixedly mounted on said shaft, the stator substantially fully occupying the space defined between the shell and the sleeve and hub, and the end wall having a substantially flat outer surface for supporting a tape spool on said shaft end.

3. The motor arrangement of claim 2, wherein said metal shell is of a ferromagnetic material.

4. The motor arrangement of claim 2, wherein said metal shell is of a non-magnetic light metal and carries a ferromagnetic lining facing the stator.

5. The motor arrangement of claim 2, wherein said metal shell is of a non-magnetic light metal and further including a cylindrical housing of ferro-magnetic material secured to said stator and surrounding the light metal shell.

6. The motor arrangement of claim 2, wherein said metal shell, end wall and hub of the rotor constitute an integral unit of ferromagnetic material.

7. The motor arrangement of claim 2, wherein said metal shell, end wall and hub of the rotor constitute an integral unit of a non-magnetic light metal, the light metal shell carrying a ferromagnetic lining facing the stator.

8. The motor arrangement of claim 2, further including a flat plate member mounted on the end wall of the rotor and flush with its hub.

9. An electric motor arrangement for a magnetic sound recorder and the like, comprising, in combination: a support plate formed with an opening therethrough, said opening having an axis; a hollow sleeve mounted on said plate, a stator fixedly mounted on said sleeve and extending transversely of said plate from one side of the latter, a shaft mounted in said hollow sleeve for rotation about said axis, said shaft having an end extending through said opening beyond the stator, a rotor constituted by a thin-walled cylindrical metal shell, an end wall and a hub fixedly mounted on said shaft, the cylindrical metal shell being closely adjacent and surrounding the stator, the stator substantially fully occupying the space defined between the shell and the sleeve and hub, the end wall having a substantially flat upper surface on the other side of said plate for carrying a tape spool on said shaft end and said end wall radially extending from said axis and substantially covering said opening, and a stationary cylindrical housing of a ferromagnetic material mounted on said plate, said housing spacedly surrounding said rotor shell and cooperating with the stator to provide a path of flow for the flux.

10. An electric motor arrangement for a magnetic sound recorder and the like, comprising, in combination: a support plate formed with an opening therethrough, said opening having an axis; a hollow sleeve mounted on said plate, a stator fixedly mounted on said sleeve and extending transversely of said plate from one side of the latter, a shaft mounted in said hollow sleeve for rotation about said axis, said shaft having an end extending through said opening beyond the stator, a rotor constituted by a thin-wall cylindrical metal shell having an open end opposite said shaft end on said one side of said plate, an end wall opposite said open end on the other side of said plate and substantially covering said opening and a hub fixedly mounted on the shaft and carrying said end wall, said metal shell defining at least one opening adjacent said end wall, the cylindrical metal shell being closely adjacent and surrounding the stator, the stator substantially fully occupying the space defined between the shell and the sleeve and hub, the end wall having a substantially flat outer surface for carrying a tape spool on said shaft end, a stationary cylindrical housing of ferromagnetic material mounted on said plate, said housing spacedly surrounding said rotor shell and cooperating with the stator to provide a path of flow for the flux, said housing having an end wall spaced slightly from the open end of the rotor metal shell, said end wall of the stationary housing supporting the hollow sleeve and defining at least one opening adjacent the stator, said end wall of the rotor having an outwardly extending flange overlapping the space between the rotor shell and the stationary housing, and a plurality of projections fixed to said flange for moving air through the openings of the rotor shell and stationary housing end wall during rotation of the rotor.

References Cited in the file of this patent

UNITED STATES PATENTS

| | | |
|---|---|---|
| 724,827 | Eastwood | Apr. 7, 1903 |
| 1,481,213 | King | Jan. 15, 1924 |
| 1,611,089 | Wallis | Dec. 14, 1926 |
| 1,697,279 | Klemm | Jan. 1, 1929 |
| 1,779,099 | Magrath | Oct. 21, 1930 |
| 2,039,770 | Birdsell | May 5, 1936 |
| 2,058,024 | Logan | Oct. 20, 1936 |
| 2,079,143 | Albertson | May 4, 1937 |
| 2,175,860 | Waimann | Oct. 10, 1939 |
| 2,179,341 | Mueller | Nov. 7, 1939 |
| 2,427,947 | Kock | Sept. 23, 1947 |
| 2,492,678 | Amtsberg | Dec. 27, 1949 |
| 2,628,322 | Richardson | Feb. 10, 1953 |
| 2,773,206 | Zozulin | Dec. 4, 1956 |
| 2,782,263 | Hoehn et al. | Feb. 19, 1957 |
| 2,813,686 | Schroter | Nov. 19, 1957 |

FOREIGN PATENTS

| | | |
|---|---|---|
| 171,673 | Switzerland | Dec. 1, 1934 |